United States Patent [19]

Sonoda et al.

[11] 4,429,390
[45] Jan. 31, 1984

[54] DIGITAL SIGNAL TRANSMITTING SYSTEM

[75] Inventors: Takenori Sonoda; Nobuhiko Watanabe; Masato Tanaka, all of Tokyo, Japan

[73] Assignee: Sony Corporation, Tokyo, Japan

[21] Appl. No.: 290,848

[22] Filed: Aug. 7, 1981

[30] Foreign Application Priority Data

Aug. 14, 1980 [JP] Japan .................................. 55-112014

[51] Int. Cl.$^3$ .............................................. G06F 11/10
[52] U.S. Cl. .......................................... 371/40; 371/38
[58] Field of Search ....................... 371/37, 38, 39, 40; 360/38

[56] References Cited

U.S. PATENT DOCUMENTS

| | | | |
|---|---|---|---|
| 3,781,795 | 12/1973 | Zegers | 371/39 |
| 4,145,683 | 3/1979 | Brookhart | 340/146.1 F |
| 4,202,018 | 5/1980 | Stockham | 360/47 |
| 4,211,997 | 7/1980 | Rudnick et al. | 371/38 |
| 4,238,852 | 12/1980 | Iga et al. | 371/40 |
| 4,306,305 | 12/1981 | Doi et al. | 371/40 |
| 4,356,564 | 10/1982 | Doi et al. | 371/40 |

OTHER PUBLICATIONS

*IBM Technical Disclosure Bulletin*, C. H. Wolff, "Multiple Channel Correction of Burst Errors", vol. 7, No. 3, Aug. 1964, pp. 190–191.

*Primary Examiner*—Jerry Smith
*Assistant Examiner*—Gary V. Harkcom
*Attorney, Agent, or Firm*—Lewis H. Eslinger; Alvin Sinderbrand

[57] ABSTRACT

A digital signal is encoded for error correction, and the encoded digital signal is transmitted in M transmitting paths. The signal to be encoded occurs as N sequences of data words. A plurality n of sequences of error correcting words are generated from respective words of the N sequences delayed by respective different delay times of $(D-d_i)$ words, where $d_i$ is a whole number associated with an ith one of the n error correcting word sequences. The resulting N data word sequences and n error correcting word sequences are provided with respective different total delay times, so that the total delays of the N sequences differ by an integral number D of words from one another. Blocks of the delayed N data sequences and n error correcting word sequences are formed and the blocks are cyclically distributed among the M transmitting paths. The values of M, N, n, D, and $d_i$ are selected so that the least common multiple of any two values of $(d-d_i)$ is greater than $(N+n-1)D$; and for any value of $(D-di)$, $(d-di)$ and M are relatively prime. Favorably, M is selected as $2^k$, and $(D-d_i)$ is odd.

11 Claims, 12 Drawing Figures

FIG.2
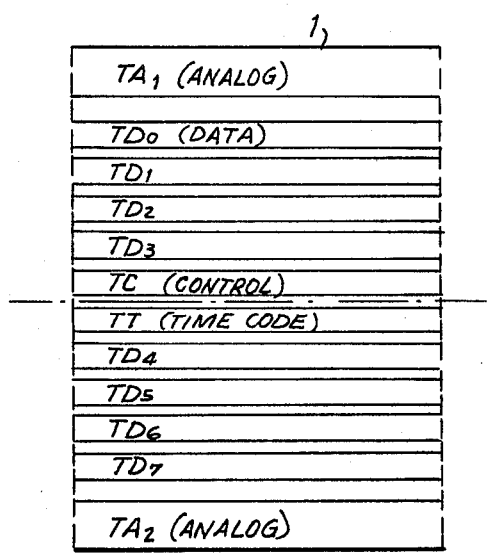
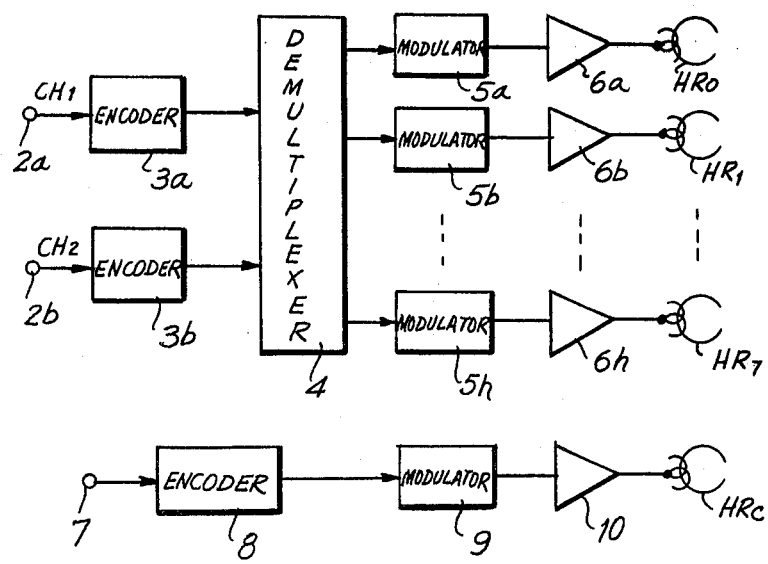
FIG.3

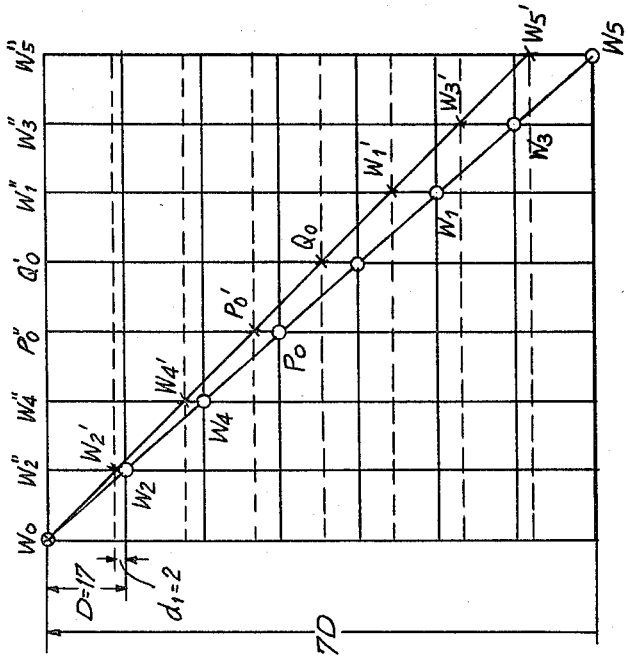
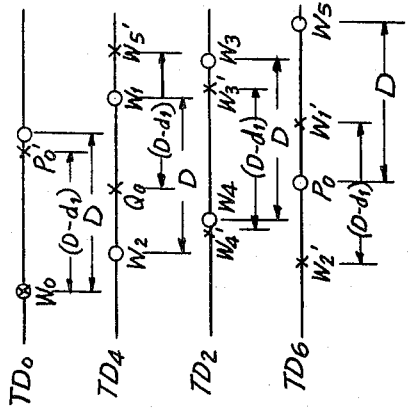
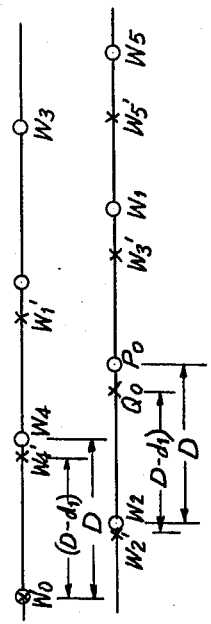
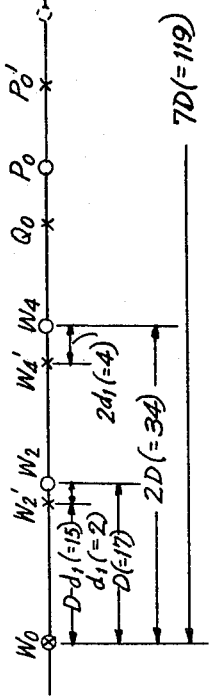

DIGITAL SIGNAL TRANSMITTING SYSTEM

BACKGROUND OF THE INVENTION

1. Field of the Invention

This invention relates to digital signal transmitting systems, and is more particularly directed to a transmission system in which a digital signal is distributed among a plurality of transmission paths. Specifically, this invention involves error correction encoding of a digital signal to be transmitted on a plurality of distribution paths, favorably by means of recording the signal on plural tracks of a recording medium.

2. Description of the Prior Art

One method of encoding a digital signal for error correction and protection from so-called burst errors (such as drop out in the case of a recorded signal) has been proposed in our application Ser. No. 218,256, filed Dec. 19, 1980, issued on Oct. 19, 1982 as U.S. Pat. No. 4,355,392. This method involves rearranging or "interleaving" the words of the digital signal prior to transmission or recording, and then "de-interleaving" or restoring the received or reproduced signal back to its original arrangement. This technique has the advantage of distributing any drop out or burst errors over a large number of the original blocks of the digital signal, so that the correctability of the erroneous words is improved. This prior proposed method more particularly involves a cross-interleaving technique in which PCM data sequences are interleaved two or more times. In such cross-interleaving method the data words are grouped into a plurality of different error correcting code blocks, and each data word relates to several error correcting words. Thus, this technique is rather powerful for correcting burst errors.

Stationary-head, plural track, digital audio tape recording machines have also been previously proposed. In such machines, a plurality of parallel longitudinal tracks are formed on a magnetic tape, and a multi-channel digitized audio signal is recorded thereon. In order to enable the recorder to operate at a reduced speed and to minimize tape consumption, an audio PCM (pulse-code modulated) signal representing a single channel is distributed to several of the plurality of tracks and is recorded thereon.

In such a stationary-head recorder, the above cross-interleaving technique can be used to advantage to improve the correctability of burst errors. However, because the PCM signal is distributed among several tracks, a problem arises in that a burst error extending across two or more of the tracks (e.g., caused by fingerprints or dirt on the tape) can impair the error correctability. Furthermore, correctability of random errors may not be the same for all tracks, but may undesirably vary from track to track.

OBJECTS AND SUMMARY OF THE INVENTION

It is an object of this invention to provide an improved error-correction-encoding digital signal transmission system for use in transmitting a digital signal that is distributed over a plurality of transmission paths.

It is another object of this invention to provide such a digital signal transmission system wherein error correction encoding is carried out so that the portions of the digital signal distributed on the respective transmission paths are uniformly error-correctable.

It is still another object of this invention to provide a digital signal transmission system wherein digital signals, for which a cross-interleave techique is carried out to provide error-correction encoding, can be recorded on a plurality of recording tracks of a record medium without any loss of error-correcting power.

Accordingly, the method of this invention advantageously is provided for encoding a digital signal that occurs as N sequences of data words, and comprises the steps of forming a plurality n of error-correcting word sequences (e.g., by modulo-2 addition) generated from elements formed from the respective words of said N sequences of data words delayed by respective different delay times of $(D-d_i)$ words, where i is an index identifying an associated one of said n error correcting word sequences and takes on a value $i=0$ to $n-1$; providing the resulting N data word sequences and n error correcting word sequences with respective different total delay times, so that the N data word sequences have respective total delay times that differ by an integral multiple of a number D of words; forming blocks of the delayed N data word sequences and n error correcting word sequences; and distributing such blocks cyclically among a plurality M of transmitting paths (e.g., magnetic recording tracks). In order to ensure optimum error correcting power, the values of M, N, n, D, and $d_i$ are selected as integers satisfying the conditions that (i) the least common multiple of any two values of $(D-d_i)$ is greater than $(N+n-1)D$; and (ii) for any value of $(D-d_j)$, $(D-d_i)$ and M are relatively prime. Preferably, a further condition is satisfied such that M is an integral power of 2 (e.g., 2, 4, 8, 16, etc.) and $(D-d_i)$ is odd. The conditions are favorably satisfied when M, N, n, D, $d_o$, and $d_i$ are set to be $2^k$, 6, 2, 17, 0, and 2, respectively.

Encoder apparatus for carrying out the above process can also be constructed according to this invention.

The above and other objects, features, and advantages of this invention will become readily apparent from the ensuing description, when read in conjunction with the accompanying drawings.

BRIEF DESCRIPTION OF THE DRAWINGS

FIG. 2 is a schematic diagram of a magnetic tape record track pattern as used in one embodiment of this invention;

FIGS. 3 and 4 are block diagrams respectively showing recording and playback systems employed with any of several possible embodiments of this invention;

FIGS. 8 and 9 are schematic diagrams for explaining the interleaving process of this invention; and FIGS. 10, 11, and 12 are schematic diagrams showing the relations of the various word sequences when digital signals are recorded on four, one, and two data tracks, respectively.

DETAILED DESCRIPTION OF A PREFERRED EMBODIMENT

With reference to the drawings, and initially to FIG. 1 thereof, which illustrates a generalized encoder, the scheme for encoding a digital signal of an integral number of N sequences of input data words to include an integral number n of error correction words will be described.

Figure 1:
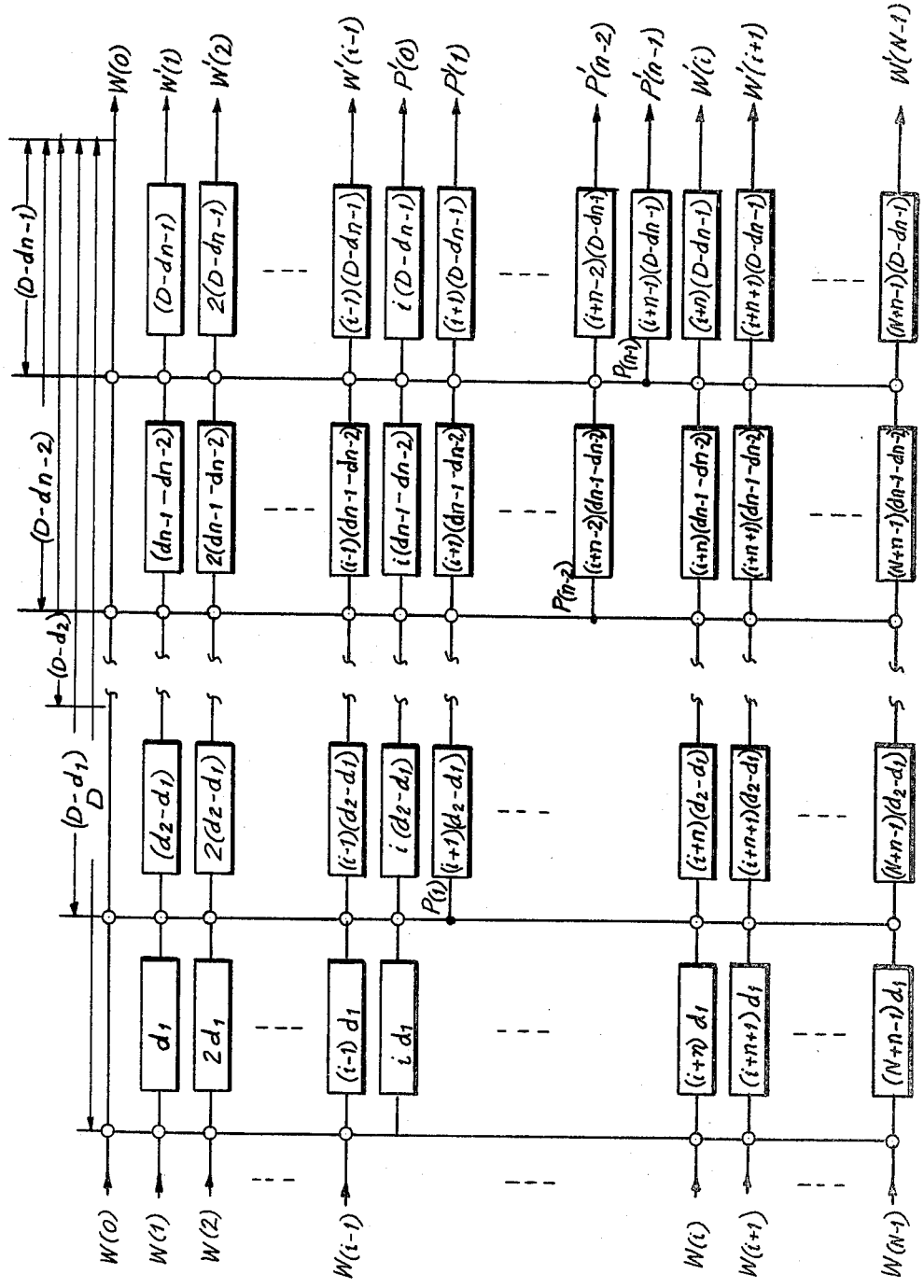
FIG. 1 is a block diagram for explaining the general concepts of delay processing and cross-interleaving according to this invention.

In FIG. 1, the N data word sequences, which are preferably in the form of a PCM series signal, are processed from left to right, and delays are imparted thereto in delay circuits shown as boxes thereon. The respective delay times for the various delay circuits are expressed in terms of an integral number of word length times as indicated by the legends within the corresponding boxes. In practice, a random access memory (RAM) is used for each delay circuit.

The PCM serial signal is presented to the encoder of FIG. 1 as a plurality N of parallel PCM data sequences. In the illustrated encoder, the N sequences are substantially equally divided into two groups: $W(0)$ to $W(i-1)$ and $W(i)$ and to $W(N-1)$. A plurality n of error correction word sequences, generated in the encoder, are disposed between the last sequence $W(i-1)$ of the first group and the first sequence $W(i)$ of the second.

In the case that the digital signal represents a channel of an audio signal, it is preferred that digital words representing adjacent samples of the audio signal occur in alternate groups. This will prevent adjacent such words from occurring too close to one another in the transmitted signal, and thus will facilitate the masking of uncorrectable errors. Such masking is favorably carried out by an interpolation technique. Stated otherwise, words representing the audio signal at successive times occur as pairs of words $W(0)$ and $W(i)$, $W(1)$ and $W(i+1)$, ..., to $W(i-1)$ and $W(N-1)$. Consequently, the sequences of words $W(i)$ to $W(N-1)$ are provided with delays that are larger than those provided for the sequences $W(0)$ to $W(i-1)$, so that at the output of the encoder the distance between the words representing successive samplings of the audio signal is as large as possible.

The PCM data word sequences $W(0)$ to $W(i-1)$ are provided with respective different total delay times of 0 words, D words, 2D words, ..., and $(i-1)D$ words to appear as respective output sequences $W'(0)$ and $W'(i-1)$. Similarly, the PCM data word sequences $W(i)$ to $W(N-1)$ are similarly given different total delay times of $(i+n)D$ words, $(i+n+1)D$ words, ... and $(N+n-1)D$ words to appear as respective output sequences $W'(i)$ to $W'(N''1)$.

As is apparent from the drawing, these delays are provided in n stages and n sequences of error correction words $P(0)$ to $P(n-1)$ are formed in advance of each stage of delay. More particularly, the N data word sequences are used, in the illustrated encoder, for generation of each of the error correction word sequences $P(0)$ to $P(n-1)$ by modulo-2 addition. In the illustrated encoder, modulo-2 adders, shown as filled-in circles ●, receiving as their generating elements words delayed at the inputs of the decoders of the respective one of the n stages of delay. Here the inputs of the delays providing these generating elements are shown as open circles ○.

For example, the first error correcting word sequence $P(0)$ is derived by modulo-2 addition of the undelayed words $W(0)$ to $W(N-1)$.

Thereafter any previously developed error correction word sequences, appropriately delayed, are also used as generation elements for any subsequent error correction word sequences.

For example, the error correction word sequence $P(0)$ is provided with a delay of $id_1$ words and is used as a generation element of the second error correction word sequence $P(1)$, together with the word sequences $W(0)$ to $W(i-1)$ and $W(i)$ to $W(N-1)$ delayed by respective amounts of 0, $d_1$, $2d_1$, ... $(i-1)d_1$, $(i+n)d_1$, ... and $(N+n-1)d_1$ words. This word sequence $P(1)$ is thereafter delayed an amount $(i+1)(d_2-d_1)$ and is used as a generation element for the next error correction word sequence $P(2)$, together with the previously formed word sequence $P(0)$ and the word sequences $W(0)$ to $W(N-1)$ delayed by respective different amounts 0, $(d_2-d_1)$, $2(d_2-d_1)$, ... $i(d_2-d_1)$, $(i+n)(d_2-d_1)$, ... and $(N+n-1)(d_2-d_1)$ words.

In general, the total delay time that each PCM data sequence is subjected to is provided as n stages each with a different delay time so that each stage is an integer times $(D-d_i)$ distant from the output side, where D and $d_i$ are integers. There the integers $d_i$ are selected to have different values $d_0-0 < d_1 < d_2 < ... < d_{n-1} < D$.

Accordingly, $(N+n)$ sequences of digital words are provided as error-encoded, cross-interleaved output sequences $W'(0)$, $W'(1)$, ... $W'(i-1)$, $P'(0)$, $P'(1)$, ... $P'(n-1)$, $W'(i)$, $W'(i+1)$, ... and $W'(N-1)$. These sequences, considered in parallel, constitute a progression of successive blocks $B_i$ including the $(N+n)$ cross-interleaved words. The successive blocks $B_i$ also include a synchronization word and a cyclic-redundancy-check code (CRC), or other check code word. The blocks so formed are alternately distributed among M transmission paths, such as M tracks of a magnetic tape. That is, of a sequence of successive blocks $B_o$, $B_1$, $B_2$, ... $B_n$, the block $B_o$ is recorded on a first track, the block $B_1$ on a second track, and the block $B_2$ on a third track. The distribution is cyclical, so that, for example, blocks $B_{M+1}$, $B_{2M+1}$, are recorded on the first track, and blocks $B_{M+2}$, $B_{2M+2}$, ... are recorded on the second track.

As aforementioned, the error correction words $P(1)$ to $P(n-1)$ are formed not from the PCM data words $W(0)$ to $W(N-1)$ alone, but also from any error correction words formed in previous stages. Thus, these previously-formed error correction words are also given protection from burst and random errors, and can be corrected if necessary by use of the later-formed error correction words. Consequently, as the number n of error-correction words provided within any code block $B_i$ is increased, the error correctability thereof is further enhanced. However, this increase involves increasing the number of delay stages, and, consequently increases the complexity of the encoder and decoder apparatus. Thus, in the following embodiments, the number of stages and the corresponding number n of error correction words is selected as 2.

According to this invention, the error correctability of the cross-interleaved signal recorded on M tracks of a magnetic tape is equivalent to the error correctability that can be attained when the signal is recorded on only a single track. In this invention the error correction sequence $P(0)$ and the words which constitute its generating elements are separated by intervals of D blocks on the recorded tape, and similarly the error correction sequences $P(1)$, $P(2)$, ... and $P(n-1)$ and the respective words which constitute their respective elements are separated from one another by intervals of $(D-d_1)$, $(D-d_2), \ldots (D-d_{n-2})$, and $(D-d_{n-1})$ blocks. Thus, although in a multitrack digital recording two or more words on different tracks can be affected by the same burst error, the distances of D, $(D-d_1), (D-d_2) \ldots$ and $(D-d_{n-1})$ can be selected to ensure that error correction can still take place. In this invention these distances are selected so that the words that constitute generation elements for the respective error correction words $P(0)$, $P(1), \ldots P(n-1)$ are separated so that the chance that more than one such word is affected by the same burst error is minimized. To establish optimum error correctability, it is required that the separation distances mentioned above be provided across all of the M tracks.

In order to meet this condition, the values of N, n, M, D, and $d_i$ should satisfy at least the following criteria:

(i) The least cmmon multiple of any two values of $(D-d_i)$ must be greater than the product $(N+n-1)D$. This can be expressed mathematically as $$\text{L.C.M. } [(D-d_i), (d-d_j)] > (N+n-1)D$$

where L.C.M. is a least-common-multiple operator, and $i<j$, $i,j=0$ to $(n-1)$.

(ii) The delay times $(D-d_i)$ and the number of tracks M are selected to have no common factor greater than unity. In other words, $(D-d_i)$ and M must be relatively prime. This can be expressed mathematically as:

$$\text{G.C.D. } [D-d_i, M] = 1$$

where G.C.D. is a greatest-common-divisor operator, and $i=0$ to $(n-1)$.

The first criterion, which must hold for all combinations of $(D-d_i)$ and $(D-d_j)$, implies that the generating elements of the error correction word sequences $P(i)$ ($i=0$ to $(n-1)$) have a maximum of one-word overlap in the period of maximum delay $(N+n-1)D$. Thus, even though the generating elements of an error correction word in any particular sequence $P(i)$ may have more than one erroneous word therein, the generating elements for a corresponding word in the next adjacent sequence $P(i-1)$ will have no more than one erroneous word. This condition is satisfied regardless of the number M of tracks.

The second criterion implies that the generating elements for each error correction word are distributed uniformly along the various tracks. In other words, if the generation elements for each error correction word are distributed more to some tracks than to others, the ability of the decoder to correct errors will be better in some tracks and worse in others, and consequently the ability for correcting burst errors in each track of a multitrack recording will be different from that in a single track recording.

A third criterion should be satisfied as well, although it is not an absolute requirement to practice this invention. This criterion can be stated:

(iii) When any two delay amounts $(D-d_i)$ and $(D-d_j)$ are divided by the number of tracks M, the results will yield different respective remainders. This can be expressed mathematically $$(D-d_i) \cdot (\text{Modulo } M) \neq (D-d_j) \cdot (\text{Modulo } M) \text{ where } i<j, i,j=0 \text{ to } (n-1).$$

This criterion assures that the respective data word sequences that generate each error correction word sequence will be distributed to the M tracks in different orders. This criterion is also required to ensure that the various error correction word sequences $P(i)$ are distributed uniformly among the M tracks.

Here it is noted that if the number of tracks is an integral power of two $(M=2^k)$ the criterion (ii) is satisfied if $(D-d_i)$ is odd while the criterion (iii) is satisfied if $n \leq 2^{k-1} = M/2$.

A more specific embodiment of this invention can be described in detail with reference to FIG. 2, which shows a section of magnetic tape 1 which has been recorded with a digital signal encoded according to this invention. In this embodiment, the magnetic tape 1 is of one-quarter-inch width, and contains eight data tracks $TD_0$ to $TD_7$, two analog tracks $TA_1$ to $TA_2$, a control track TC, and a time code track TT thereon. The audio signal is in the form of a two-channel signal, such as a stereo signal, and correspondingly a pair of audio PCM signals CH1 and CH2 are distributed to and stored on alternate ones of the eight data tracks $TD_0$ to $TD_7$. In other words, the audio PCM signal CH1 is recorded on the tracks $TD_0$, $TD_2$, $TD_4$, and $TD_6$, while the signal CH2 is recorded on the tracks $TD_1$, $TD_3$, $TD_5$, and $TD_7$. More specifically, successive blocks $B_1$, $B_2$, $B_3$, and $B_4$ of the audio PCM signal are distributed cylically to the tracks $TD_0$, $TD_4$, $TD_2$, and $TD_6$, respectively, while the blocks $B_1$, $B_2$, $B_3$, and $B_4$, of the signal CH2 are distributed cyclically to the tracks $TD_1$, $TD_5$, $TD_3$, and $TD_7$, respectively.

The analog tracks $TA_1$ and $TA_2$, which are provided on outboard portions of the tape 1, contain analog versions of the respective PCM signals CH1 and CH2, and are used for reference purposes, for instance, to facilitate tape editing.

The control track TC preferably includes a servo control signal which can be used to regulate the speed of tape advancement. However, this control track TC can instead or additionally include an address signal, a mode control signal, or the like. The control signal recorded on the control track TC is preferably in the form of serial data encoded by a high density recording technique, such as the 3PM system, and is frequency modulated for recording.

The time code tract TT can include a time code signal for use in monitoring the length of advancement of the tape 1.

Figure 4:
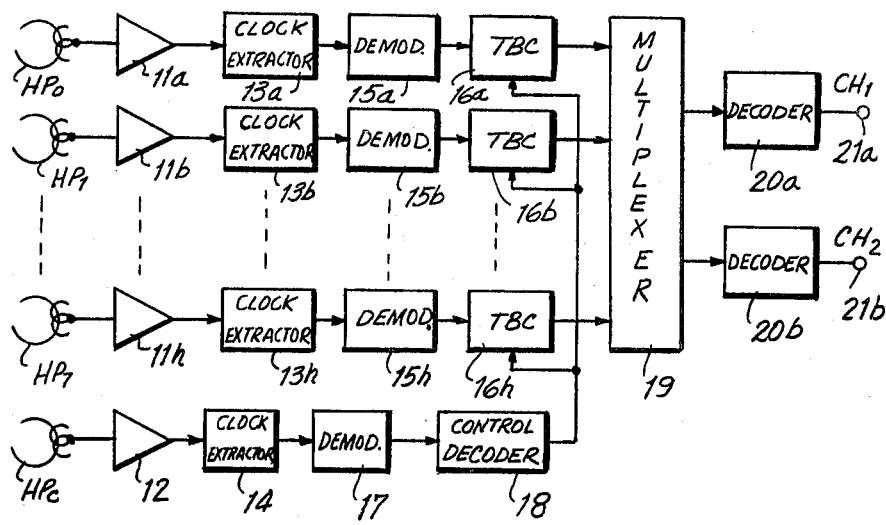

FIGS. 3 and 4 respectively illustrate arrangements for recording and playback. Each respectively incorporates encoders and decoders embodying the present invention.

In the recording arrangement of FIG. 3, input terminals 2a and 2b respectively receive the PCM data signals CH1 and CH2, and these signals are then provided to respective encoders 3a and 3b. The latter encoders operate according to the principles explained with respect to FIG. 1, and are set forth in greater detail below. The encoders 3a and 3b provide encoded blocks of data to a demultiplexer 4, which serves to distribute the two PCM signals CH1 and CH2 to the eight tracks $TD_0$ to $TD_7$. More particularly, the demultiplexer 4 provides eight separate output signals to respective modulators 5a to 5h, which provide a modulated output through respective linear amplifiers 6a to 6h and thence to in-line static recording heads $HR_0$ to $HR_7$.

At the same time, a control signal is provided to a control signal input 7, which is coupled to the input of a control signal encoder 8. The properly encoded control signal is then furnished to a modulator 9, which is coupled through an amplifier 10 to a control signal recording head HR$_c$.

As shown in FIG. 4, the data signal playback heads HP$_0$ to HP$_7$ and the control signal playback head HP$_c$ are provided to contact the respective data tracks TD$_0$ to TD$_7$ and the control track TC of the magnetic tape 1. The heads HP$_0$ to HP$_7$ are coupled through respective playback amplifiers 11a to 11h and 12 to respective clock extractor circuits 13a to 13h and 14. As aforesaid, the recorded signal is preferably of the type which is suitable for a self-clocking decoder, and the bit spacings of the data signals themselves are used to control the clock rate.

Following the clock extractors 13a to 13h, the picked-up data signals are provided through the modulators 15a to 15h to respective time base corrector circuits 16a to 16h. At the same time, control signals are applied from the clock extractor 14 through a demodulator 17 to a control decoder 18. Predetermined address signals, which are contained in the signals recorded on the control track TC, are decoded in the control decoder 18, and the latter provides address signals to the time base correctors 16a to 16h to specify the write addresses to memory circuits which are contained in the time base correctors 16a to 16h. The time base correctors 16a to 16h have respective read address signals applied thereto from a reference clock source (not shown). Consequently, the time base correctors 16a to 16h provide output data signals in which any time base variation is removed.

Although not shown, the control decoder 18 also can provide a capstan servo control signal to control the speed of advancement of the tape 1.

The eight output data signals from the respective time base correctors 16a to 16h are supplied to inputs of a multiplexer 19 which serves to convert the eight played-back signals to the two encoded audio PCM signals CH1 and CH2. These two signals are supplied from the multiplexer 19 to respective decoders 20a and 20b, which are complementary to the encoders 3a and 3b of FIG. 3. These decoders 20a and 20b serve to correct errors which may occur during the recording and playback processes, and to mask any uncorrected errors. The finally reconstituted PCM audio signals CH1 and CH2 are then provided to respective output terminals 21a and 21b.

Figure 5:
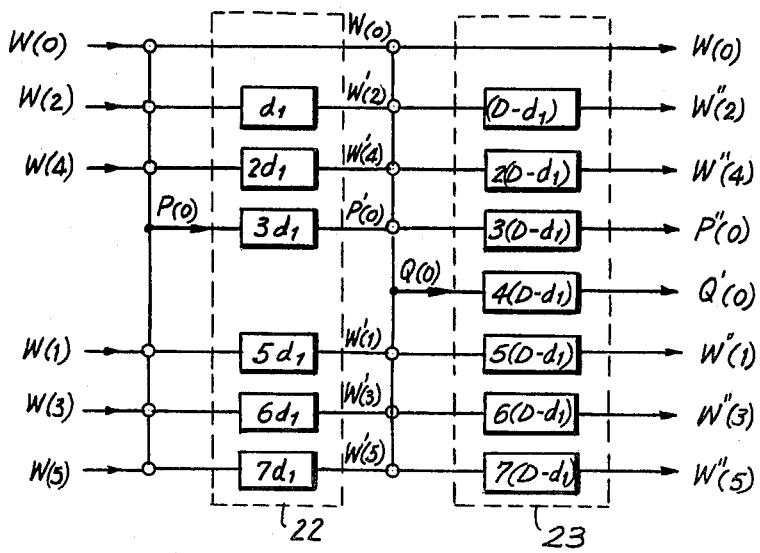
FIG. 5 is a block diagram showing an arrangement of a double-interleave circuit according to an embodiment of this invention.

The encoders 3a and 3b of the recording system of FIG. 3 each have the same construction and include a multiple-interleave circuit such as that shown in FIG. 5.

As shown in FIG. 5, the PCM audio signal CH1 and CH2 are each partitioned into six separate word sequences, consisting of even-word data sequences W(0), W(2), W(4), and odd word data sequences W(1), W(3), and W(5). The six data sequences are applied one word at a time to a modulo 2 adder to produce therefrom a first parity word sequence P(0). This parity word sequence is used upon reproduction for the correction of errors in the data word sequences W(0) to W(5). The first parity word sequence P(0) can be understood as derived according to the following operation, when $\oplus$ represents modulo 2 operation:

$$P(0) = W(0) \oplus W(1) \oplus W(2) \oplus W(3) \oplus W(4) \oplus W(5)$$

Each data sequence is formed of every sixth word substantially as follows $$W(0) = (W_0, W_6, W_{12} \ldots)$$

$$W(2) = (W_2, W_8, W_{14} \ldots)$$

$$W(4) = (W_4, W_{10}, W_{16} \ldots)$$

$$W(1) = (W_1, W_7, W_{13} \ldots)$$

$$W(3) = (W_3, W_9, W_{15} \ldots)$$

$$W(5) = (W_5, W_{11}, W_{17} \ldots)$$

$$P(0) = (P_0, P_6, P_{12} \ldots)$$

The above data sequences are then applied to a first interleaver stage 22 wherein the above data sequences are delayed by respective multiples of d$_1$ words. Here, the sequences W(0), W(4), P(0), W(1), W(3), and W(5) are delayed by amounts of 0, d$_1$, 2d$_1$, 3d$_1$, 5d$_1$, 6d$_1$, and 7d$_1$, respectively. The word sequences so delayed in the interleaver stage 22 are identified with a prime. Each of the seven sequences W(0), W'(2), W'(4), P'(0), W'(1), W'(3), W'(5) appearing at the output of the interleaver stage 22 is applied to a second modulo 2 adder where the seven sequences are added in modulo 2 to provice a second parity word sequence Q(0). Thereafter, the data word sequences W(0) and W'(1) through W'(5), and the parity word sequences P'(0) and Q(0) are applied to a second interleaver stage 23. The latter stage includes delay circuits so that the sequences W(0), W'(2), W'(4), P'(0), Q(0), W'(1), W'(3), and W'(5) are delayed by respective amounts of 0 words, (D−d$_1$) words, 2(D−d$_1$) words, 3(D−d$_1$) words, 4(D−d$_1$) words, 5(D−d$_1$) words, 6(D−d$_1$) words, and 7(D−d$_1$) words. Thus, the interleaver stage 23 provides at its output the eight sequences W(0), W''(2), W''(4), P''(0), Q'(0), W''(1), W''(3), W''(5), where a double prime is used to indicate that a particular sequence has undergone two stages of delay.

Figure 6:
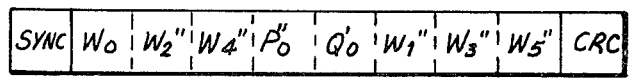
FIG. 6 is a schematic diagram of one block of a data sequence in a form to be recorded.

From the output of the second interleaver stage 23, the words are assembled in block form as shown in FIG. 6, and are provided with a leading synchronizing signal SYNC and a following cyclic redundancy check code CRC. Thus, the blocks constituted by the synchronizing signal SYNC, the eight words which appear at one time from the output of the interleaver stage 23, and the check code signal CRC are provided to the demultiplexer 4 to be distributed to one of the modulators 5a to 5h.

Figure 7:
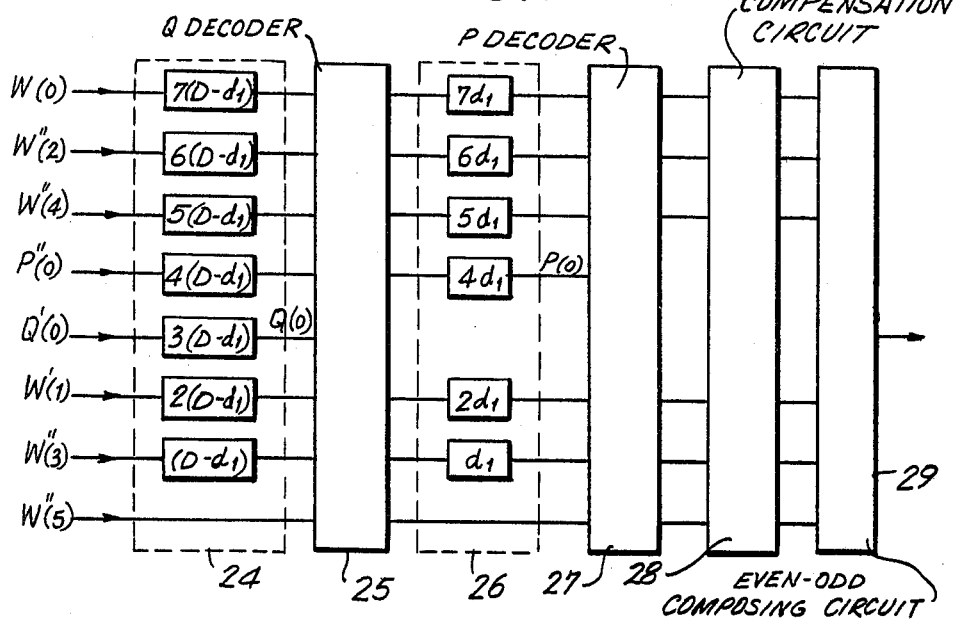
FIG. 7 is a block diagram showing an arrangement of a de-interleave circuit according to an embodiment of this invention.

FIG. 7 illustrates detail of the corresponding decoders 20a and 20b of the arrangement of FIG. 4, which are both of the same construction and are complementary to the arrangement shown in FIG. 5.

Initially, the reproduced blocks received from the multiplexer 19 undergo an error detection process in a CRC checker (not shown), and any erroneous words are provided with a pointer bit. Following that, the block is partitioned into the eight sequences including the even word sequences W(0), W''(2), and W'''(4), the parity sequences P''(0) and Q'(0), and the odd data sequences W'''(1), W'''(3), and W'''(5). These sequences are applied to a deinterleaver stage 24 which applied thereto delays which serve to compensate for the delays imparted in the corresponding interleaver stage 23 of the encoder 3a or 3b. The deinterleaver stage 24 is followed by a Q-decoder 25 which serves to correct errors in the words of the sequences W(0), W'(2), W'(4)', P'(0), W'(1), W'(3), and W'(5) by checking the same against the words of the second parity data sequence Q(0).

If any word identified as being erroneous with a pointer bit is corrected in the Q-decoder 25, the associated pointer bit is cleared.

Following the Q-decoder 25, the data sequences W(0), W'(2), W'(4), P'(0), W'(1), W'(3), and W'(5) are furnished to another deinterleaver stage 26 which imparts respective delays thereto to compensate for the delays provided in the corresponding interleaver stage 22.

Thereafter, the deinterleaved word sequences W(0) to W(5) and the first parity word sequence P(0) are applied to a P-decoder 27.

In the P-decoder 27, any erroneous word in the sequences W(0) to W(5) is corrected by checking the same against the parity words of the sequences P(0). If any such erroneous word is corrected, the pointer bit associated therewith is cleared. However, if more than one word is erroneous and the words cannot all be corrected, then the pointer bit associated with any uncorrected erroneous word is maintained.

The P-decoder 27 is followed by a compensation circuit 28 in which any uncorrectable erroneous word is compensated or masked, for example by interpolation. For example, if a particular word, such as word $W_3$ is in error, a satisfactory substitution therefore can be made by interpolating between the adjacent words $W_2$ and $W_4$. That is to say, an error in the word $W_3$ can be masked by substituting a value equal to the average of the words $W_2$ and $W_4$.

The decoded and compensated sequences W(0) to W(5) are provided from the compensation circuit 25 to an even-odd composing circuit 29, in which the six word sequences are converted into a single digital audio channel to reconstitute the audio PCM signal CH1 or CH2.

Figure 8:
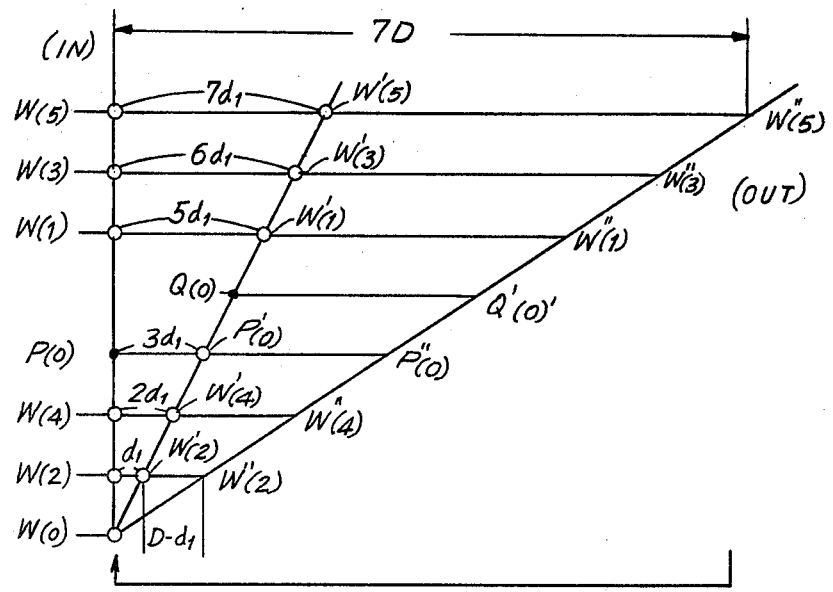

The relative delay times of the double interleaving process carried out in the encoder of FIG. 5 will have a relationship which can be explained generally as shown in FIG. 8. Therein, the seven sequences W(0), W(2), W(4), P(0), W(1), W(3), and W(5), appear together at the input of the interleaver stage 22 to form a first error correcting block. Then, at the output of the interleaver stage 22, wherein the words of the first error correcting block are delayed by respective multiples of $d_1$ words, there appears a second error correcting block W(0), W'(2), W'(4), P'(0), Q(0), W'(1), W'(3), and W'(5). The words of the second error correcting block are interleaved in the second interleaver stage 23, providing the respective words thereof with delays which are multiples of $(D-d_1)$. Then, the output block W(0), W''(2), W'''(4), P''(0), W''(1), W'''(3), and W'''(5), appears at the output of the second interleaver stage 23.

Thus, it is apparent that the words of the first error correcting block are separated by a multiple of D from the position of the corresponding words of the output block, while the words of the second error correcting block are delayed by multiples $(D-d_1)$ from the same corresponding words of the output block.

As is apparent from the foregoing description, the decoder of FIG. 5 the arrangement of the above described embodiment has the parameters N, n, M respectively set equal to 6, 2, and 4. The requirements of this invention are satisfied if the delay parameters D and $d_1$ are respectively set at preferred values of 17 and 2. In that case, all of the criteria (i), (ii), and (iii) are satisfied.

First, remembering that $d_0=0$, if the above criterion (i) is tested, it will be seen that the lowest common multiple of 17 and 15 is 255, which exceeds the product $(N+n-1)\times D=7\times 17=119$. The result of this can be explained favorably with respect to FIG. 9, which shows a chart of the timing of the respective words constituting generating elements of the parity words P(0) and Q(0), where D and $d_1$ are respectively 17 and 2. Here, the six words constituting generating elements of the first parity words P(0) are identified with circles while the seven words constituting the generating elements of the second parity words Q(0) are identified by a cross. As is apparent from the chart of FIG. 9, the sequences constituting generating elements for the two sequences of parity words P(0) and Q(0) are the same only for the first data word W(0). Thus, if D and $d_1$ are selected as 17 and 2, respectively, the probability of more than one erroneous word occurring among the various words constituting the generating elements for the parity words P(0) and Q(0) is kept at a minimum.

Moreover, as the values $D=17$ and $(D-d_1)=15$ are both odd numbers, and because $M=4$ has no odd factors, it is apparent that the condition (ii) is also satisfied.

As aforedescribed, in this embodiment the PCM data signal CH1 is recorded block-by-block, in turns, in the data tracks $TD_0$, $TD_4$, $TD_2$, and $TD_6$. As a result of the criterion (ii) being satisfied, the words constituting generating elements for the parity word P(0) are distributed uniformly and are thus uniformly recorded on the four data tracks $TD_0$, $TD_4$, $TD_2$, $TD_6$, with a constant distance D between adjacent ones of such elements.

Similarly, the words constituting the generating elements of the second parity word Q(0) are also uniformly distributed to and recorded on the four data tracks, and are separated by a uniform distance $(D-d_1)$. As a consequence, the error correctability of each of the four data tracks $TD_0$, $TD_4$, $TD_2$, $TD_6$ is equal and such error correctability is equivalent to that achieved in a single-track recording technique.

Moreover, in the above-described embodiment the criterion (iii) is also satisfied as $n=2=4/2=2^{k-1}$. Consequently, as shown in FIG. 10, the words constituting generating elements for the parity word $P_0$ are distributed in the order $TD_0$, $TD_4$, $TD_2$, $TD_6$ in a cyclical repeating order. However, the words constituting generating elements for the parity word $Q_0$ are distributed in a different cyclic repeating order of $TD_0$, $TD_6$, $TD_2$, $TD_4$.

FIGS. 11 and 12 respectively shown the word pattern for cross-interleaved data sequences that are recorded on two tracks or on a single track, respectively.

When a data sequence is recorded on only a single track, as shown in FIG. 12, the criterion (i) is satisfied and when such a data sequence is recorded on two tracks, the criterion (ii) is also satisfied.

Generally speaking, when the number of tracks M is selected $M=2^k$, the criterion (iii) will be satisfied so long as $D=17$ and $d_1=2$. More particularly, if $k=2$ then 17(modulo 4)=1 and 15(modulo 4)=3.

Thus, it is apparent that any cross-interleaving using the respective delay parameters D and $d_1$ of 17 and 2 will be suitable for any and all multi-track recordings wherein the number of tracks M is a power of two (i.e., 1, 2, 4, 8, etc.).

It is noted that while parity words P(0) and Q(0) are utilized herein as error correcting codes, the invention is not limited to the use of parity words, and many other types of error correcting codes, such as b-adjacent codes can easily be used instead.

Moreover, while a specific preferred embodiment of this invention has been described hereinabove with reference to the accompanying drawings, it is to be understood that the invention is not limited to that precise embodiment, and that various changes and modifications can be effected therein by one skilled in the art without departing from the scope or spirit of the invention as defined in the appended claims.

We claim as our invention:

1. Apparatus for encoding a digital signal for protection against burst errors, wherein said digital signal occurs as N sequences of data words, comprising input means for receiving said N sequences; encoder means for generating an error correcting word sequence, in each of a plurality n of stages, from said N sequences of data words in a previous stage; delay means for delaying respective words of said N sequences by respective different delay times of $(D - d_i)$ words from an output of said n stages, in each of said n stages, where i is an index identifying an associated one of said n stages and takes on a value $i = 0$ to $n - 1$, and with said N sequences and the n error correcting word sequences at the output of said n stages being delayed with respective total delay times that differ from one another by an integral multiple of a number D of data words; and distributing means forming blocks of the N data word sequences and n error correcting word sequences and distributing such blocks cyclically among a plurality M of transmitting paths; wherein the values of M, N, n, D, and $d_i$ are all positive integers which satisfy the conditions that the least common multiple of any two values of $(D - d_i)$ is greater than $(N + n - 1)D$; and for any value of $(D - d_1)$, $(D - d_i)$ and M are relatively prime.

2. Apparatus according to claim 1, wherein M is an integral power of two, and all values of $(D - d_i)$ are odd.

3. Apparatus according to claim 1, wherein said distributing means includes demultiplexer means for distributing said N data sequences and said n check word sequences among M channels, each such channel including modulator means for modulating the demultiplexed data and error correcting word sequences and transducer means for recording the modulated sequences on a respective track of a record medium.

4. Apparatus for decoding a received digital signal to correct errors occurring therein during transmission, wherein said digital signal is formed of N sequences of data words and a plurality n of error correcting word sequences, the N data word sequences and n error correcting word sequences being delayed in each of a plurality n of stages by respective different delay times of $(D - d_i)$ words from the output of said n stages, where i is an index identifying an associated one of said n stages and takes on a value $i = 0$ to $n - 1$, each of said N data sequences and n error correcting word sequences being provided with a different total delay time such that the delay times differ from one another by an integral multiple of a number D of data words; and the digital signal is distributed among M receiving channels; wherein M, N, n, D, and $d_i$ are all positive integers which satisfy the conditions that the least common multiple of any two values of $(D - d_i)$ is greater than $(N + n - 1)D$; and for any value of $(D - d_i)$, $(D - d_i)$ and M are relatively prime;

said apparatus comprising receiving means for cyclically deriving said distributed N data sequences and said n error correcting word sequences from said M channels;

a plurality n of stages, each stage including error correction decoder means provided with the N data word sequences and at least a respective one of said n error correcting word sequences from a previous stage, for correcting data words of said N sequences based on at least a respective one of said n error correcting word sequences;

delay means provided in each stage for providing a compensatory delay to said N data word sequences and to said n error correcting word sequences to restore said N data word sequences to their relative timing prior to encoding; and output means providing a corrected received digital signal.

5. Apparatus for decoding a received digital signal according to claim 4, wherein said output means includes means for detecting any data words having an error uncorrected by said error correction decoder means, and for interpolating between neighboring data words to provide an interpolated data word in substitution for such data word having said uncorrected error.

6. Apparatus for decoding a received digital signal according to claim 4, wherein said received digital signal is reproduced from M tracks on a record medium, and a reference timing signal is derived from another track on said medium, and wherein said receiving means includes respective time base correction means for each of said M channels responsive to said reference timing signal for removing time base errors in the portion of the digital signal carried on the respective channel.

7. A method of encoding a digital signal for error correction, wherein said digital signal occurs as N sequences of data words, comprising the steps of forming an error correcting word sequence, in each of a plurality n of stages, from said N sequences of data words in a previous stage; delaying said N sequences of data words by respective different delay times of $(D - d_i)$ words from an output of said n stages, in each of said n stages, where i is an index identifying an associated one of said n stages and takes on a value $i = 0$ to $n - 1$, and with the N sequences at the output of said n stages being delayed with respective total times that differ by an integral multiple of a number D of data words; forming blocks of the delayed N data word sequences and n error correcting word sequences; and distributing such blocks cyclically among a plurality M of transmitting paths; wherein the values of M, N, n, D, and $d_i$ are all positive integers which satisfy the conditions that the least common multiple of any two values of $(D - d_i)$ is greater than $(N + n - 1)D$; and for any value of $(D - d_i)$, $(D - d_i)$ and M are relatively prime.

8. A method of encoding a digital signal according to claim 7, wherein M is an integral power of two, and all values of $(D - d_i)$ are odd.

9. A method of encoding a digital signal according to claim 8, wherein N, D, and n are respectively 6, 17, 2; $d_0$ is 0, and $d_i$ is 2.

10. A method of encoding a digital signal according to claim 7, wherein M, D, and all values of $d_i$ are selected to further satisfy the condition that for any two values of i, the remainders of the respective expressions $D - d_i/M$ will have different values.

11. A method of encoding a digital signal according to claim 10, wherein M is selected to be $2^k$ where k is a positive integer, and n is selected to be no greater than $2^{k-1}$.

* * * * *